Effect of U:Ni ratio on resistance to coke deposition

United States Patent Office 3,847,836
Patented Nov. 12, 1974

3,847,836
NICKEL-URANIUM CATALYST
Thomas Nicklin, 39A Rochdale Road, Middleton, Manchester, England, and Frederick Farrington, Flat 4, Stanton St., Stretford, Lancashire, England
Continuation of application Ser. No. 8,359, Feb. 3, 1970, which is a continuation-in-part of application Ser. No. 651,116, July 5, 1967, which in turn is a continuation-in-part of application Ser. No. 432,899, Feb. 15, 1965, all now abandoned. This application July 11, 1972, Ser. No. 270,850
Int. Cl. B01j *11/06, 11/22*
U.S. Cl. 252—465
7 Claims

ABSTRACT OF THE DISCLOSURE

Steam reforming catalysts are described containing as active components nickel, and/or nickel oxide, together with uranium oxide, supported on a carrier. The ratio of the proportions of uranium to nickel, by weight is from about 0.45 to about 0.76 and the uranium content lies within the range of 5 percent to 30 percent by weight of the catalyst composition. Small quantities of alkali metal oxide may also be present in the composition. The preferred carriers include $\alpha$-alumina.

---

This is a continuation of application Ser. No. 8,359, filed Feb. 3, 1970, now abandoned, which in turn is a continuation-in-part of patent application Ser. No. 651,116, filed July 5, 1967, now abandoned, which was itself a continuation-in-part of patent application No. 432,899, filed Feb. 15, 1965, also abandoned.

BACKGROUND OF THE INVENTION

(1) Field of the Invention

This invention relates to catalysts for use in carrying out gaseous phase reactions, and especially the reforming and subsequent treatment of hydrocarbons. The invention further relates to methods of preparing the catalysts and to processes employing them.

(2) Description of Prior Art

The reforming of light hydrocarbons with steam has become a well established process. The process produces mixtures of hydrogen, oxides of carbon, methane and small quantities of higher hydrocarbons such as ethane.

The essential characteristics of an efficient steam-reforming catalyst are:

(1) The activity should be such that equilibrium conversion of the feedstock is attained under the operating temperature and pressure conditions.

(2) It should inhibit the deposition of carbonaceous materials.

(3) The structural stability under conditions of high temperatures and pressure must be good.

The commercial development of catalysts meeting the above requirements, for the reforming of $C_1 \rightarrow C_4$ hydrocarbons was achieved in the period of 1945–50. It was concluded that nickel catalysts were superior to other systems and also that nickel dispersed on refractory alumina spheres ($\alpha$-alumina) formed an active catalyst of excellent thermal stability. Numerous other supports were examined, MgO, $SiO_2$, $SiO_2$-$Al_2O_3$, SiC, $ZrO_2$-$SiO_2$ and a number of materials were found to be suitable, of these MgO gave the most uniformly active catalysts. Many oxides were found to have a promoting effect e.g. MgO, $Al_2O_3$, $Cr_2O_3$, CaO, $ThO_2$, $Ce_2O_3$ etc., these generally being added in concentrations of *1 to 2%*.

The steam reforming process produces mixtures of hydrogen, oxides of carbon, methane and small quantities of higher hydrocarbons such as ethane. In recent years the steam reforming of light petroleum distillates at high pressure has been used by the British Gas Industry for the production of fuels of various calorific values.

The complex chemistry of the process involves a combination of thermal and catalytic cracking, followed by catalytic conversion of the intermediates with steam. The catalysts used are active enough for the various reactions to reach equilibrium, or at least for equilibrium to be a controlling factor, and as a result the composition of the product gas can be controlled by the steam to hydrocarbon ratio, the temperature and the pressure.

Catalysts for use with $C_4 \rightarrow C_7$ feedstocks, e.g. naphtha, were not available commercially until 1957, nickel-$\alpha$-alumina catalysts giving rise to "coke" deposition and feedslip under low "lead" conditions. It was found necessary to prepare more "active" catalysts by using higher concentrations of nickel and high surface area supports, a typical method of preparation being to co-precipitate nickel and $\gamma$-$Al_2O_3 \cdot H_2O$, bind the mixture with a cement calcine and pelletize it.

As examples of the prior art in this field, U.S. Pat. No. 1,673,032, published in 1928, discloses a large number of promoters which, it states, may be incorporated in a nickel catalyst. Uranium oxide, aluminium oxide and potassium oxide are included individually within the list of promoters. The promoter is said, preferably to be combined with the nickel in the form of a compound.

U.S. Pat. No. 2,486,361, published in 1949, and No. 2,510,189, published in 1950 also disclose metal oxide catalysts for use in the reforming, although not specifically steam reforming. The prior art, as exemplified by these three patent specifications, however, gives no teaching as to the benefits to be obtained from the use of catalysts comprising, as active ingredient, nickel and uranium oxide, supported on a carrier.

With these types of nickel catalyst, no relationship was found between activity and surface area or porosity, activity appearing to be dependent solely on nickel concentration.

OBJECTS OF THE INVENTION

It is therefore an object of the present invention to provide an improved catalyst composition for vapour phase reactions.

It is a further object of the present invention to provide a catalyst composition with increased activity when used in the steam reforming of hydrocarbons.

Another object of the invention is to provide a catalyst composition possessing greater resistance to "coke" deposition during a steam reforming composition.

Further objects of the invention will become clear from the remainder of the specification.

SUMMARY OF THE INVENTION

In brief, the present invention provides a catalyst composition for use in the reforming of hydrocarbons with steam at an elevated temperature, which catalyst comprises (1) at least one member of the group consisting of nickel and nickel oxide,
(2) at least one member of the group consisting of uranoso-uranic oxide ($U_3O_8$) and uranium trioxide ($UO_3$), and
(3) a carrier, the ratio by weight of uranium to that of nickel, present in the catalyst composition being from about 0.45 to about 0.76, in the reduced form, and the composition containing uranium, in the said oxide form, in an amount of from 5 to 30 percent based on the total weight of the catalyst.

The invention is based upon the very surprising discovery that the particular combination of components constituting the catalysts of the invention results in optimum surface area and pore volume properties together with much increased resistance to "coke" deposition when the catalyst is in use in a steam reforming process.

DESCRIPTION OF PREFERRED EMBODIMENTS OF THE INVENTION

The uranium oxide content of the catalyst is, as stated above, within the range of from 5 to 30 percent or, preferably of from 5 to 15 percent based on the weight or the total weight of the catalyst.

The catalyst composition may also comprise a small quantity of an alkali metal compound, such as the hydroxide, oxide or carbonate of lithium or potassium.

The alkali metal compounds that may be included in the catalyst composition should be alkali metal oxides and/or precursors therefor e.g. an alkali metal compound which will decompose to the oxide at a temperature below 800° C.

The alkali metal compound content of the catalyst may range between 0 and 5 percent, based on the weight of the compound percent in relation to the total weight of the catalyst. In general the amount should be sufficient merely to neutralise the acid sites on the carrier so that the tendency for carbon to be deposited is reduced. When potassium is used with an alumina (corundum) carrier, it is preferably used in an amount of from 0.01 to 0.5%. Unlike conventional nickel catalysts, however, large amounts of alkali metal are not necessary. Alkali doping in such conventional catalysts in amounts of about 7% by weight were found to be almost essential to inhibit "coke" and carbon deposition on the surface of the catalyst which would render the catalyst inactive if allowed to proceed unchecked. Not only does the presence of such large amounts of alkali interfere with the activity of the catalyst, but it also leads to the presence of alkali compounds in the vapour leaving the reactor. This alkali, which has been leached out of the catalyst by the steam present in the reactor may cause corrosion of plant further downstream. Furthermore, the removal of the alkali metal compound from the catalyst composition permits a greater rate of "coke" decomposition which in turn precipitates plant shut-down. Since "coke" deposition is not a major problem of catalysts of the present invention the lower alkali metal concentrations which may be used result in considerable savings by reason of increased plant and catalyst life.

The expression "alkali metal" includes sodium, lithium and potassium. Typical examples of alkali metal compounds are the salts of oxygen-containing acids such as carbonates, bicarbonates, nitrates, oxalates and acetates of lithium, sodium and potassium, and also the oxides and hydroxides of alkali metals and compounds which yield the oxides at elevated temperatures. The preferred alkali metal compounds are compounds of lithium and potassium. We have found, however, that when a lithium compound is used, its influence is substantially unimpaired by prolonged operation of the catalyst. Furthermore, lithium compounds have the advantage (which they share with potassium compounds), of being effective when used in a smaller concentration than say, sodium.

Lithium nitrate will decompose on heating to give the oxide, which, in turn is not reduced or affected by hydrogen, carbon or carbon monoxide at elevated temperature. In particular, lithium oxide will not form a volatile hydride in an atmosphere of hydrogen. An advantageous method of preparing the catalyst is to incorporate lithium nitrate in a melt of a mixture of uranium and nickel nitrate or acetate crystals when preparing the catalyst by the methods herein described.

Not all alkali metal compounds are suitable for incorporation in the catalysts employed in the present invention. Certain compounds, in particular the halides of alkali metals, when incorporated adversely affect the effectiveness of a catalyst composition in the reforming of hydrocarbons in the presence of steam as set out above. Whether a particular alkali compound is or is not suitable for incorporation in a catalyst to be used in the process of the invention may readily be ascertained by a person familiar with the field of the invention by a simple process of experimental trial and error. No claim is made herein to a process wherein the catalyst composition, when subjected to the conditions of a conventional hydrocarbon steam reforming process (which include an elevated temperature and the presence of steam and strongly reducing gases), fails to be effective in the reforming of the hydrocarbons as set out above, whether such failure is due to the presence of the wrong sort of alkali metal compound such as a halide, or to any other reason.

Where the catalyst composition comprises a metal compound convertible to nickel oxide at an elevated temperature, such nickel compound may consist of a nickel salt such as the nitrate which decomposes on heating to give the oxide.

Likewise, the uranium compound convertible to uranoso-uranic oxide and/or uranium trioxide at elevated temperatures may consist of a uranium salt such as uranium nitrate. Alternatively the uranium compound may consist of a uranate e.g. ammonium diuranate, which decomposes on heating to give the required oxide or oxides. A particularly advantageous form of uranium compound is potassium uranate, which will decompose at elevated temperatures to give not only the necessary uranium oxide or oxides but also potassium oxide which will fulfill the requirement (when necessary) for a suitable alkali metal compound.

As is known in the case of uranium, decomposition of an oxygen-containing salt unstable to heat such as the nitrate yields in the first place the trioxide, $UO_3$, which in turn is converted at a temperature of about 500° C. to 600° C. to give the compound known as uranoso-uranic oxide, $U_3O_8$.

The carrier may be any suitable support material such as aluminium oxide or an alkaline earth metal oxide (or a mixture such as alumina and magnesium oxide), which may be used alone or in conjunction with other refractory material which is stable under the conditions of the reaction. By the term "alkaline earth metal oxide" is meant the oxide of magnesium, calcium, strontium, or barium.

The carrier should not, whether by reason of its nature or the amount present, be such as to inhibit or destroy the effectiveness of the catalyst composition. It has been found that certain support materials, by reason of their excessively acidic nature, render the catalyst composition inoperative. The presence of halogens in the catalyst, whether in the carrier or combined with any of the compounds deposited on its surface, is a disadvantage and the catalyst in its final form under the conditions of the reforming process should be substantially free from halogen. The suitability of any particular support material may readily be ascertained by a person familiar with the field of the invention by a simple process of trial and error, and no claim is made herein to a process wherein the catalyst composition employed is rendered ineffective by reason of the nature and/or amount of unsuitable support material present.

It has been found that magnesium oxide may advantageously be used as a support material in conjunction with alumina. The support material may comprise a proportion of a binding agent to strengthen it, for example an aluminous cement such as "Secar" or portland cement.

The catalytic steam reforming process of the invention may be applied to hydrocarbon feedstocks of varying kinds, including open chain hydrocarbons, e.g. $CH_4$, $C_2H_6$, $C_3H_8$, $C_4H_{10}$, $C_5H_{12}$, aliphatic hydrocarbons and mixtures thereof, and to various petroleum fraction such as light naphtha (boiling in the range of up to 140° C.), heavy naphtha (boiling in the range of up to 230° C.), gas oil, refinery and coke oven gases.

When applying the process of the invention to hydrocarbon distillates, it has been found that for low boiling distillates, i.e. those boiling at temperatures up to 120° C., good results are obtained from the use of a catalyst which has no alkali metal compound present. On the other hand, when applying the process to distillates boiling at above 120° C., it has been desirable to incorporate an alkali metal compound, preferably a lithium or potassium compound into the catalyst.

Catalyst compositions incorporating potassium compounds may be prepared in a number of ways.

In one method nickel and uranyl nitrates are dissolved in water and aluminium oxide, or aluminium oxide and magnesium oxide are added, followed after a period of stirring by potassium carbonate solution, the mixture then being filtered and burnt to the corresponding oxides at 600–650° C., and finally mixed with a binding material and pelleted.

In a second method, shaped carriers of alumina or spinel (magnesium aluminate) are impregnated with a solution of salts of nickel and uranium and fired to form the oxides, the impregnation and firing being repeated if necessary, the carriers finally being dipped in potassium hydroxide solution and then calcined.

In a third method according to the invention, salts of nickel, uranium, aluminium and potassium are heated and melted together and then further heated to produce oxides, ground and pelleted. The salts used are preferably nitrates.

Similar methods for preparing catalyst compositions containing lithium compounds.

The conditions of the steam reforming reaction are well understood in the art, and it is well known that gases of widely varying composition can be made by a suitable choice of feedstock, pressure, temperature, and the steam to hydrocarbon ratio.

The steam to hydrocarbon ratio used in the process of the present invention should be at least sufficient to prevent any substantial deposition of carbon on the catalyst. In general a minimum of 1.5 lbs. of steam is preferred for every pound of hydrocarbon contained in the feed. Air may be included in the reaction mixture, in which case conditions can be chosen such that the reaction proceeds wholly or in part autothermetically.

The following illustrates the variation of the general reaction conditions according to the desired product when reforming naphtha:

| Product gas | Temperature (° C.) | Pressure (p.s.i.) | Steam to hydrocarbon ratio (lbs./lb.) |
| --- | --- | --- | --- |
| Lean gas | 700–900 | Up to 500 | 3.0–4.0 |
| Town gas | 450–750 | Up to 600 | [1] 1.75–3.0 |
| Rich gas | 350–550 | Up to 1,000 | 2 |

[1] Preferably 2.5.

The following table illustrates specific steam reforming conditions for various feedstocks.

| Mehane content of product gas | Feedstock | | | | | | | | |
| --- | --- | --- | --- | --- | --- | --- | --- | --- | --- |
| | Methane | | | L.N. | | | H.N. | | |
| | P | T | R | P | T | R | P | T | R |
| 3.8 | | | | | | | 14 | 720–740 | 5.5 |
| 4 | | | | | | | 12 | 740 | 4 |
| 10 | 12 | 740 | 3 | 12 | 740 | 3.4 | | | |
| 10 | 12 | 800 | 2 | 28 | 840 | 2.5 | | | |
| 10 | | | | 28 | 880 | 2 | | | |
| 30 | 12 | 600 | 3 | 28 | 680 | 2.5 | | | |

| Methane content of product gas | Feedstock | | | | | |
| --- | --- | --- | --- | --- | --- | --- |
| | Methane | | | L.N. | | |
| | P | T | R | P | T | R |
| 30 | 12 | 650 | 2 | 28 | 720 | 2 |
| 50 | 12 | 500 | 3 | 28 | 560 | 2.5 |
| 50 | 12 | 540 | 2 | 28 | 580 | 2 |

NOTE.—In the above table:
L.N.=a light naphtha having a final boiling point of 170° C.
H.N.=A heavy naphtha having a final boiling point of 270° C.
P=Pressure (atmospheres).
T=Temperature (° C.).
R=Steam to hydrocarbon ratio (pounds/pound).

The following examples are illustrative of the present invention.

EXAMPLES

Example 1

The following materials are used:

(1) 967 gms. nickel nitrate $6H_2O$ equivalent to 200 gm. Ni
(2) 190 gm. uranyl nitrate equivalent to 90 gm. U
(3) 10 gms. potassium carbonate anhydrous
(4) 764 gms. aluminium hydroxide equivalent to 500 gms. $Al_2O_3$
(5) 200 gms. magnesium oxide.

The nickel nitrate and uranyl nitrate are dissolved in the minimum volume of water. To this solution is added the mixture of aluminium hydroxide and magnesium oxide and the resulting slurry stired overnight. During the overnight stirring all the nickel and uranium salts are adsorbed onto the aluminium hydroxide and magnesium oxide mixture. The required amount of potassium carbonate in the minimum volume of water is then added to the stirred slurry. The slurry is filtered and washed with water, dried at 120° C. and finally burnt to the corresponding oxides at a temperature between 600° C. and 650° C.

This gives a product of the following compositions:

|  | Percent by weight |
| --- | --- |
| Nickel oxide | 23.74 |
| Uranium oxide ($U_3O_8$) | 9.91 |
| Potassium carbonate | 0.93 |
| Magnesium oxide | 18.69 |
| Aluminium oxide | 46.73 |

The resulting fine powder is mixed with starch solution and dried. It is then granulated and sieved through a No. 30 sieve and collected and sieves Nos. 40, 60 and 80. The fines are then collected in the bottom pan ready for further treatment with starch. The material collected in the three sieves is combined and to it is added 5% aluminium stearate and 7½% bentonite, this mixture is made up in a beaker and stirred, passed through a No. 30 sieve and the powder left behind due to lumps of aluminium stearate and bentonite, broken down through the sieve. The material is mixed and pelleted. It is then ignited slowly for at least 4 hours, preferably overnight at 200° C. The temperature of the muffle is increased after this time until it reaches 700° C., when the pellets are finally ignited for 4 hrs.

|  | Percent by weight |
| --- | --- |
| Nickel oxide | 22.16 |
| Uranium oxide ($U_3O_8$) | 9.25 |
| Potassium carbonate | 0.87 |
| Magnesium oxide | 17.44 |
| Aluminium oxide | 43.74 |
| Bentonite | 6.54 |

The composition therefore comprised nickel and uranium oxides in a ratio uranium to nickel, of 0.452, the magnesium and aluminium oxides acting as a carrier for the active components.

Example 2

The nitrates of nickel, uranium aluminium and lithium are heated and melted together and then further heated to produce the relevant oxides in the respective proportions by weight of 20:10:69 and 1 percent. The resulting produce is then ground and pelleted and comprises a catalyst composition having a uranium to nickel ratio of 0.54, aluminium oxide serving as a carrier for the active components of the catalyst.

Example 3

6 litres of alumina (corundum) granules (4–6 mm. diameter) were soaked for ½ hour in a melt of nickel, uranyl and lithium nitrates in such proportions as to finally give an approximate catalyst composition of Ni 20%, U 10%, $Li_2O$ 1%, the U:Ni ratio being, therefore 0.5. This composition was attained after dipping and calcining four times. The calcination temperature in each case was 400° C. When the catalyst had been charged to the reactor tube the material was reduced for 12 hours with hydrogen at 500° C. The system was then put to work as a towns gas reactor with the reactants being fed to the system in the following proportions: light virgin naphtha 1.02 gallons/hour and steam 17.5 pounds/hour. A tube outlet temperature of 620° C. was used and a consequent gas analysis of $CH_4$ 31.2%, CO 5.52% and $CO_2$ 21.0% attained. The calorific value of the make gas was 463 B.t.u./cubic foot and the plant pressure was 200 p.s.i.g.

Example 4

Spheres, extruded cylinders, rings or other shapes of a fired alumina or spinel with internal specific surface area of 1–3 m.²/gm. and a water absorption capacity of 20–35% are first heated strongly in a retort to dry out adsorbed moisture and are then quenched in a concentrated solution of salts of nickel and uranium. Suitable salts are the nitrate and a convenient way of preparing a concentrated solution is by melting together the crystalline hydrates in the correct proportions. As uranium oxide is most easily available in bulk quantities the uranium nitrate can be made by dissolving the oxide in nitric acid. After dipping, the supports are fired in a retort or furnace until the nitrates are completely decomposed. They are then quenched again and the process repeated. Normally, a single dip gives a nickel content of the order of 5% and 4–5 dips a nickel content of the order of 20% when the salt solution is composed of molten nickel nitrate and the support has an initial water absorption capacity of 20–25%. The potassium oxide is added by subsequent dipping in potassium hydroxide solution followed by calcination.

The above method is suitable for the preparation of catalysts with low nickel contents of the type used for cyclic or auto-catalytic reforming, and with nickel contents of the order of 25–30% for continuous reforming.

In preparing a catalyst by this method, two cubic feet of extruded alumina rings prepared so as to give a water absorption capacity of 20–25% but with an internal specific surface area of only 1–3 m.²/g. were heated to 600° C. to dry out thoroughly. They were then dipped into a solution of mixed nickel and uranyl nitrates. The nickel nitrate solution was made by melting crystals of nickel nitrate (500 lbs.)—the uranyl nitrate by dissolving uranium oxide (78 lbs.) in nitric acid.

The rings, constituting the catalyst carrier, were then calcined at 750° C.–800° C. until there was no further loss of nitrogen fumes. The rings were then quenched in the salt solution and the procedure repeated for a total of four dips. Following the final calcination the catalyst was soaked in 30% caustic potash for one hour, allowed to drain and dry, and finally calcined again for 1 hour.

The catalyst then contained 18.2% nickel as NiO
13.7% uranium as $U_3O_8$
3.45% potassium as $K_2O$.

The U:Ni ratio being therefore 0.752.

Example 5

This example illustrates the steam reforming of a desulphided naphtha (Esso VN20) having the following properties (before desulphiding):

Initial boiling point ____________________°C__ 40
Final boiling point _____________________°C__ 175
Specific gravity ________________________ 0.71
Organic sulphur compounds ____________p.p.m__ 8

The plant used was a modified Otto Butane Reformer of 6 million ft.³/day capacity, having a circular reformer furnace containing 28 tubes. The total catalyst volume was 108 ft.³ and the packed depth of each tube was 23 ft. The catalyst was supported on 15 mm. x 15 mm. x 5 mm. alumina cylinders and analysis showed:

Percent
Nickel __________________________________ 23.2
Uranium ________________________________ 11.45
Potassium _______________________________ 0.23

The U:Ni ratio was thus 0.48 percent.

The following data was noted for the period 60 to 191 hours from start-up:

Conditions:
  Steam ____________________________lbs./hr__ 10,600
  Naphtha __________________________lbs./hr__ 2,800
  Recycle hydrogen _________________ft.³/hr__ 2,500
  Pressure _________________________p.s.i.g__ 164
  Steam/naphtha ratio ______________________ 3.8:1
  Temperatures:
    Inlet catalyst ________________°C__ 465–490
    Outlet catalyst _______________°C__ 756
    Space velocity _______________hr.⁻¹__ 2,050

Results:
  Average analysis, percent:
    $CH_4$ _______________________________ 6.7
    CO _________________________________ 12.5
    $CO_2$ _______________________________ 14.6
    $H_2$ ________________________________ 66.2
  Equilibrium analysis, percent:
    $CH_4$ _______________________________ 6.1
    CO _________________________________ 13.1
    $CO_2$ _______________________________ 14.8
    $H_2$ ________________________________ 66.0
  Calculated calorific value ____Btu/ft.³__ 318
  Total lean gas made ___________ft.³__ 27,620,000
  Lean gas, calorific value _____Btu/ft.³__ 314
  Methane equilibrium
    temperature __________________°C__ 752
  Shift ___________________________°C__ 737
  Boudouard ______________________°C__ 685

The steam to naphtha ratio was then changed and the following data noted for the period 191 to 915 hours from start-up:

Conditions:
  Steam ____________________________lbs./hr__ 9,600
  Naphtha __________________________lbs./hr__ 2,800
  Recycle hydrogen _________________ft.³/hr__ 2,500
  Pressure _________________________p.s.i.g__ 164
  Steam naphtha ratio ______________________ 3.4:1

Example 6

Light virgin naphtha may be reacted with steam over the catalyst as produced by the process of Example 4 using outlet temperatures between 630° C. and 750° C., and inlet temperature of 400° C. and space velocities of 1100 to 1500, resulting in the production of gas mixtures containing oxides of carbon, methane and hydrogen.

Example 7

This example illustrates the use of the catalysts of the invention in the production of rich gas by the two-stage reforming of naphtha.

Essentially the process consists of passing lean gas produced in a steam reforming reactor, together with additional steam and naphtha into a fast reactor. Catalytic reforming takes place adiabatically to produce the rich gas.

Figure 1:
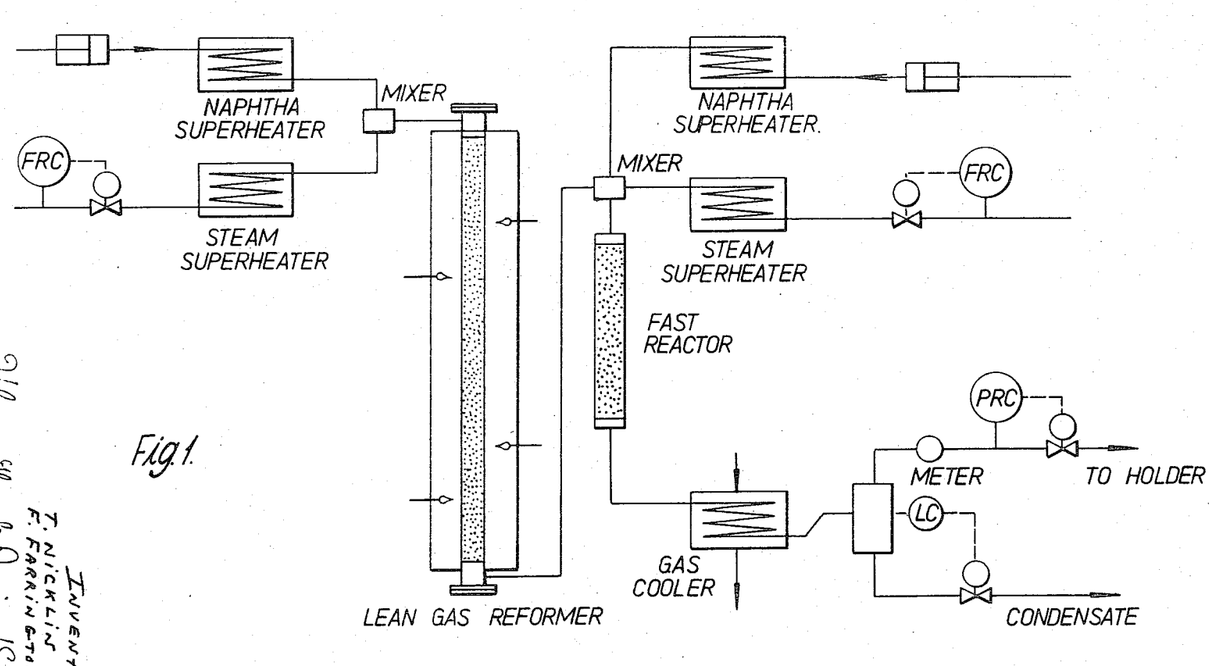

The process was conducted in apparatus as shown diagrammatically in FIG. 1, in which was incorporated a heat recovery system.

The catalyst employed in the process comprised 14 percent nickel and 10 percent uranium in the form of uranium oxide. The U:Ni ratio was therefore 0.71. In both reactors, the active components were supported on a shaped alumina support.

The naphtha feedstock used was a mixture of Esso VN400 and Esso VN100. The final boiling point of the feedstock was 136° C., the specific gravity 0.670 and the sulphur content less than 0.1 p.p.m.

The data of a typical run was as in the following table:

TABLE

| 4" Lean gas unity: | |
|---|---|
| Duration of run, hrs. | 1600 |
| Naphtha, lbs./hr. | 61 |
| Steam, lbs./hr. | 232 |
| Moles $H_2O$/c. atom | 3.04 |
| Inlet temp., °C. | 460 |
| Outlet temp., °C. | 760 |
| Outlet pres., p.s.i.g. | 130 |
| Lean gas composition: | |
| $CH_4$ | 3.30 |
| CO | 7.96 |
| $CO_2$ | 9.53 |
| $H_2$ | 43.90 |
| $H_2O$ | 35.31 |
| CV, B.t.u./ft.³ (dry) | 304 |
| Fast reactor: | |
| Wet lean gas, ft.³/hr. | 7950 |
| Naphtha, lbs./hr. | 136 |
| Steam, lbs./hr. | 321 |
| Moles $H_2O$/c. atom overall | 2.24 |
| Inlet temp., ° C. | 505 |
| Outlet pres., p.s.i.g. | 82 |
| Reactor dp., lbs. | 13.2 |
| Rich gas composition: | |
| $CH_4$ | 17.95 |
| CO | 1.93 |
| $CO_2$ | 11.31 |
| $H_2$ | 24.00 |
| $H_2O$ | 44.81 |
| $C_5H_{12}$ (dry analysis) | 0.0035 |
| CV, B.t.u./ft.³ (dry) | 474 |
| Space velocity, hrs.⁻¹ | 6690 |
| Gas made, ft.³/hr. | 9380 |
| Outlet temp., ° C. | 560 |
| $CH_4$ equiv. temp., ° C. | 572 |
| CO shift equiv., temp. ° C. | 567 |

The possible variables in the application of the fast reactor are the lean gas/naphtha ratios, lean gas composition, the inlet temperature, the overall steam ratio and the working pressure. Ideally the reactor should operate adiabatically, but depending upon the gas composition required and the economics of lean gas production, this might not always be possible.

This process is very significant, since in general, for the production of towns gas, the processes most successfully employed are those using some of the lean gas on the reactor to give a rich gas and the remainder to dilute the resultant rich gas to give a towns gas. The volume of towns gas produced is roughly 2.5 times the volume of lean gas used. The principal advantages of this scheme are:

(1) The calorific value control is simplified by the lean gas diluent (2) The calorific value is easily raised by reducing the lean gas diluent.

For rich gas production typical operating conditions could be as follows:

| | |
|---|---|
| Pressure | atmospheres 20 |
| Temperature | ° C 490 |
| Outlet temperature | ° C 550 |
| Steam/naphtha ratio | moles/c. atom 1.5 |
| Naphtha ratio (fast reactor/lean gas) | 6.3 |
| Gas produced by: | |
| $H_2$ | percent 32.6 |
| CO | do 2.0 |
| $CO_2$ | do 21.6 |
| $CH_4$ | do 53.8 |

As with well known prior art catalysts, the aluminium oxide used as support is desirably in its most refractory form i.e. in the form of α-alumina.

ADVANTAGES OF THE INVENTION

Figure 2:
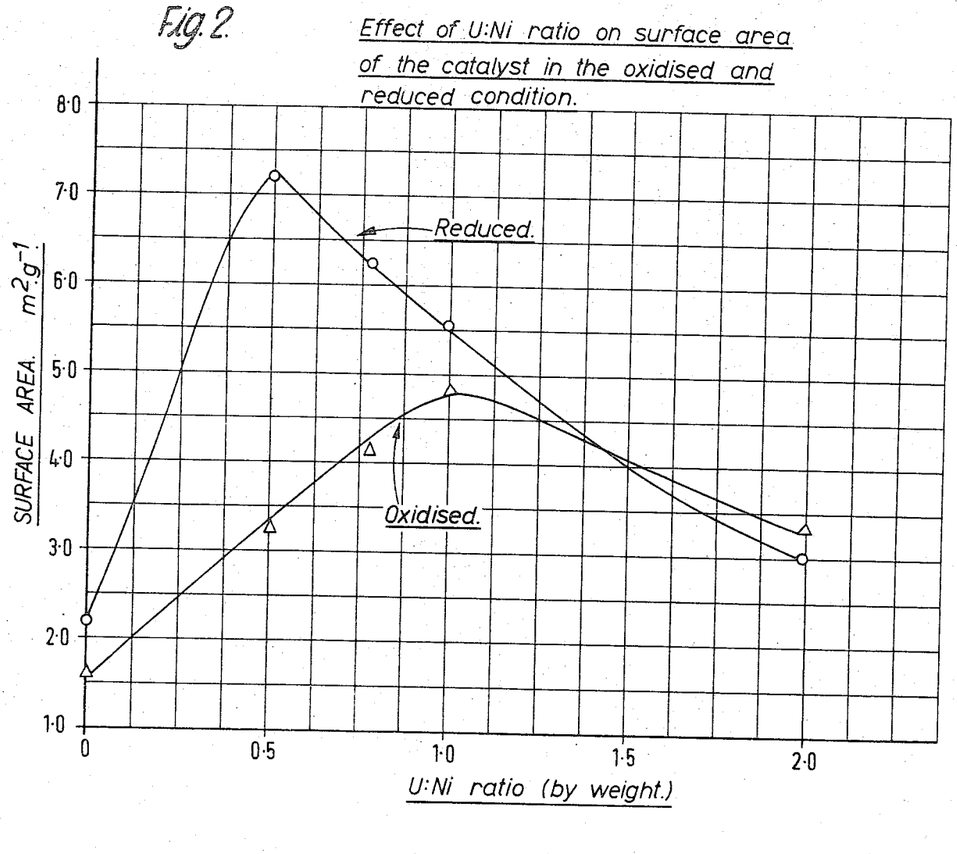
Figure 3:
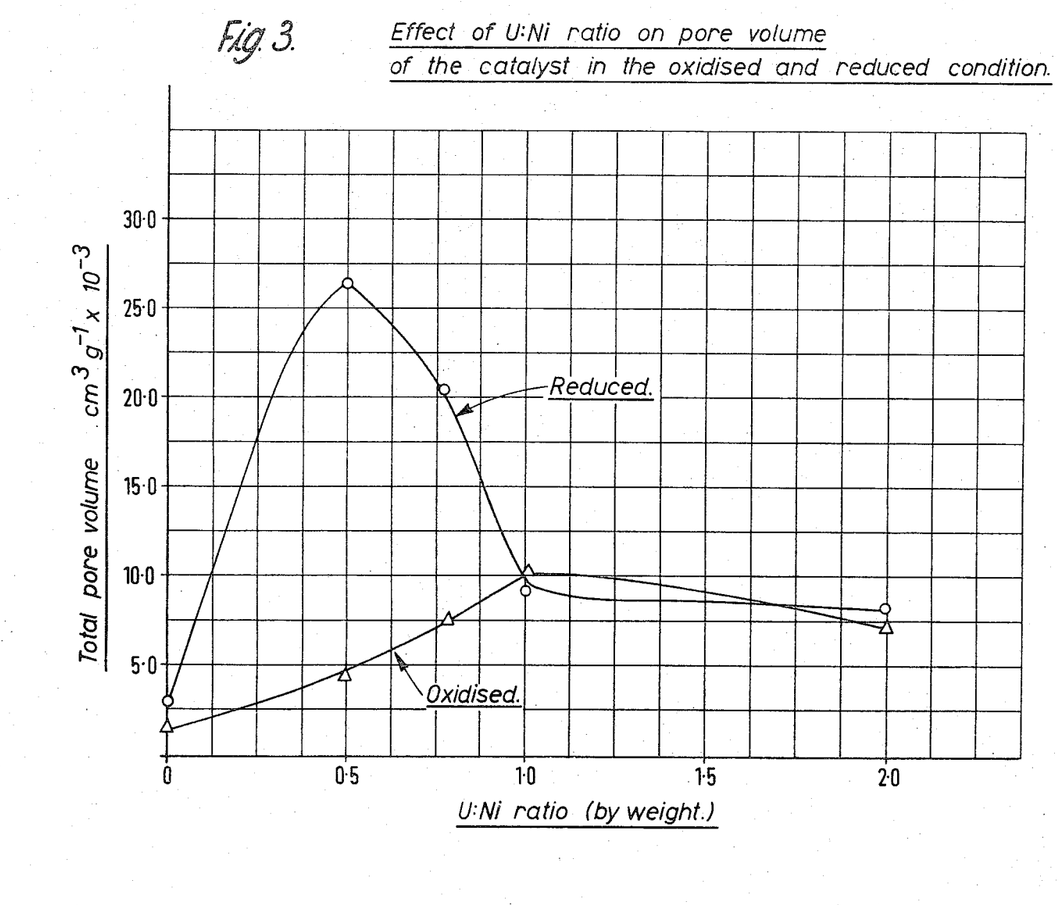
Figure 4:
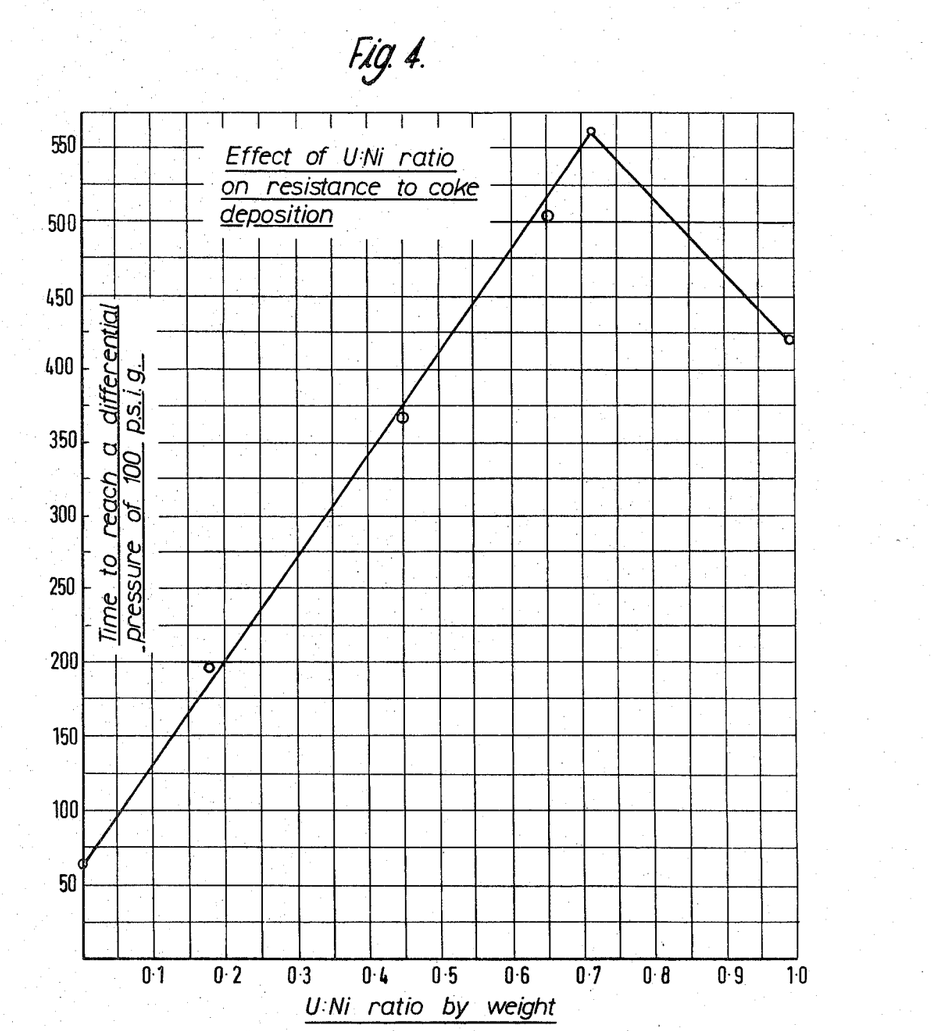

The effect of the uranium to nickel ratio on the properties of the nickel-uranium catalysts is shown in the accompanying FIGS. 2 to 4 representing graphically the results of various experiments.

FIG. 2 is a graph showing the effect of the uranium to nickel ratio on the surface area of a catalyst of the present invention, as measured by gravimetric adsorption of nitrogen at 196° C., FIG. 3 is a similar graph showing the effect of the ratio on pore volume calculated by Gurvitsch rule. It will be seen from the graphs that both surface area and pore volume were at a maximum, in the reduced state, i.e. the catalytic state, at a ratio U:Ni of 0.5.

FIG. 4 is a graph showing the relationship between the uranium-nickel ratio and the rate of coke deposition on the catalyst surface, this latter parameter being measured by measuring the time taken for a differential pressure of 100 p.s.i. to be created across the reactor. The greatest resistance to carbon deposition is seen to be at a ratio of about 0.71.

From these figures it will be seen that catalysts having a nickel-uranium ratio by weight of from 0.45 to 0.76, in the reduced form, will possess marked advantages over those catalysts having ratios outside this range.

It has also been found that regeneration of a catalyst which has suffered from "coke" deposition is fairly simple in the case of catalysts of the present invention, the activation energy of the oxidation of the "coke" deposit being relatively low (22.5 Kcal. per mole for U:Ni ratio of 0.5 and 16.8 Kcal. per mole for U:Ni ratio of 0.705).

We claim:

1. A catalyst composition suitable for use in the reforming of hydrocarbons with steam at an elevated temperature, which catalyst composition comprises:
   (1) at least one member selected from the group consisting of nickel and nickel oxide,
   (2) at least one member selected from the group consisting of uranoso-uranic oxide ($U_3O_8$) and uranium trioxide ($UO_3$), and
   (3) a carrier,
the composition containing uranium, calculated as uranoso-uranic oxide or uranium trioxide, in an amount of from 5 to 30 percent based on the total weight of the catalyst composition, the ratio of uranium to nickel present in the catalyst composition, in the reduced form, being from about 0.45 to about 0.76:1, said catalyst composition having been produced in its oxidized form by impregnating the carrier with a solution of uranium and nickel salts and calcining said salts to the oxides.

2. A catalyst composition suitable for use in the reforming of hydrocarbons with steam at an elevated temperature, which catalyst composition comprises:
   (1) at least one member selected from the group consisting of nickel and nickel oxide, (2) at least one member selected from the group consisting of uranoso-uranic oxide ($U_3O_8$) and uranium trioxide ($UO_3$), and (3) a carrier, the composition containing uranium, calculated as uranoso-uranic oxide or uranium trioxide, in an amount of from 5 to 30 percent based on the total weight of the catalyst composition, the ratio of uranium to nickel present in the catalyst composition, in the reduced form, being about 0.71:1, said catalyst composition having been produced in its oxidized form by impregnating the carrier with a solution of uranium and nickel salts and calcining said salts to the oxides.

3. A catalyst composition as claimed in claim 1 further comprising up to 5 percent by weight of potassium oxide.

4. A catalyst composition as claimed in claim 1 wherein the uranium, in the form of uranoso-uranic oxide or uranium trioxide, is present in from 5 to 15 percent based on the total weight of the catalyst composition.

5. A catalyst composition as claimed in claim 2 wherein the uranium, in the form of uranoso-uranic oxide or uranium trioxide, is present in from 5 to 15 percent based on the total weight of the catalyst composition.

6. A catalyst composition as claimed in claim 1 comprising about 22.16 percent nickel oxide, about 9.25 percent uranoso-uranic oxide, about 0.87 percent potassium carbonate, about 17.44 percent magnesium oxide, about 43.74 percent aluminium oxide and about 6.54 percent bentonite, the percentages being expressed as the weight of the component in relation to the total weight of the catalyst composition.

7. A catalyst composition as claimed in claim 1 comprising about 18.2 percent nickel as nickel oxide, about 13.7 percent uranium as uranoso-uranic oxide, and about 3.45 percent potassium as potassium oxide.

References Cited

UNITED STATES PATENTS

| | | | |
|---|---|---|---|
| 1,673,032 | 6/1928 | Williams | 423—654 |
| 3,119,667 | 1/1964 | McMahon | 423—654 |

DANIEL E. WYMAN, Primary Examiner

W. J. SHINE, Assistant Examiner

U.S. Cl. X.R.

252—466 J, 470; 423—654

UNITED STATES PATENT OFFICE
CERTIFICATE OF CORRECTION

Patent No. 3,847,836            Dated November 14, 1974

Inventor(s) Thomas Nicklin, et al

It is certified that error appears in the above-identified patent and that said Letters Patent are hereby corrected as shown below:

[30] Foreign Priority Data:

British No. 26945 & 26946 of June 16, 1966

British No. 14080 of April 6, 1964

Signed and sealed this 1st day of July 1975.

(SEAL)
Attest:

RUTH C. MASON
Attesting Officer

C. MARSHALL DANN
Commissioner of Patents
and Trademarks